United States Patent [19]
Klein et al.

[11] Patent Number: 5,691,425
[45] Date of Patent: Nov. 25, 1997

[54] POLYURETHANE DISPERSIONS

[75] Inventors: Heinz-Peter Klein, Mainz-Laubenheim; Gerd Walz, Wiesbaden; Markus A. Schafheutle, Hochheim, all of Germany

[73] Assignee: Hoechst AG, Germany

[21] Appl. No.: 908,318

[22] Filed: Jul. 2, 1992

[30] Foreign Application Priority Data

Jul. 5, 1991 [DE] Germany .................. 41 22 265.2

[51] Int. Cl.$^6$ .................................. C08F 283/04
[52] U.S. Cl. .......................... 525/455; 526/301
[58] Field of Search ................ 525/455; 526/301

[56] References Cited

U.S. PATENT DOCUMENTS 5,173,526  12/1992  Vijayendran et al. ................ 524/457

FOREIGN PATENT DOCUMENTS

| | | |
|---|---|---|
| 0033898 | 1/1981 | European Pat. Off. . |
| 0033899 | 1/1981 | European Pat. Off. . |
| 0099207 | 6/1983 | European Pat. Off. . |
| 0146897 | 12/1984 | European Pat. Off. . |
| 0249222 | 6/1987 | European Pat. Off. . |
| 0350040 | 7/1989 | European Pat. Off. . |
| 0473169 | 8/1991 | European Pat. Off. . |
| 0480251 | 9/1991 | European Pat. Off. . |

*Primary Examiner*—E. Rollins Buffalow
*Attorney, Agent, or Firm*—Bierman, Muserlian and Lucas LLP

[57] ABSTRACT

Polyurethane dispersions prepared by polymerization, initiated by free radicals, of polyurethane macromonomers containing carboxyl, phosphonic acid or sulfonic acid groups and lateral vinyl groups and optionally terminal vinyl, hydroxyl, urethane, thiourethane and/or urea groups.

These polyurethane dispersions are suitable for the production of coatings on substrates, as adhesives or as binders in printing inks.

12 Claims, No Drawings

POLYURETHANE DISPERSIONS

Aqueous polyurethane dispersions are described in EP 98 752. These polyurethane dispersions are prepared by first reacting a diol containing ionic groups, a polyol-polyether or polyol-polyester and an excess of a diisocyanate to form a prepolymer. In the second stage, this prepolymer, which contains free isocyanate groups, is then reacted with a hydroxy-alkyl (meth)acrylate. This gives a second prepolymer which contains vinyl groups, and this prepolymer is then finally polymerized in an aqueous dispersion using initiators which form free radicals. As a result of this equation, a product which contains exclusively terminal vinyl groups is formed as the second prepolymer in this reaction, and products having lateral vinyl groups are not mentioned here.

The present invention relates to polyurethane dispersions which are prepared by polymerization, initiated by free radicals, of polyurethane macromonomers containing carboxyl, phosphonic acid or sulfonic acid groups and lateral vinyl groups and optionally terminal vinyl groups and hydroxyl, urethane, thiourethane and/or urea groups.

These polyurethane dispersions can in principle be prepared by various routes. One route comprises preparing a polyaddition product by polyaddition of polyhydroxy compounds from the group comprising polyhydroxy-polyethers, polyhydroxy-polyesters and polyhydroxy-polycarbonates, and furthermore polyhydroxycarboxylic acids, polyhydroxyphosphonic acids and polyhydroxysulfonic acids, and polyisocyanates and a monomer containing at least two hydroxyl groups and at least one vinyl group. The proportions of the reactants, in particular of the polyisocyanate, are chosen here so that a macromonomer having terminal hydroxyl groups is formed. This macromonomer, which furthermore contains carboxyl, phosphonic acid or sulfonic acid groups and lateral vinyl groups, is polymerized, after being converted into an aqueous dispersion, via the vinyl groups using initiators which form free radicals to form the polyurethane dispersion, the polyurethane still carrying hydroxyl groups in this case.

Another route comprises first preparing a polyaddition product, as described in the abovementioned process variant, by polyaddition of polyhydroxy-polyethers, polyhydroxy-polyesters or polyhydroxy-polycarbonates, and furthermore polyhydroxycarboxylic acids, polyhydroxyphosphonic acids or polyhydroxysulfonic acids, and polyisocyanates and a monomer containing at least two hydroxyl groups and at least one vinyl group. In contrast to the process variant described above, the proportion of polyisocyanate here is chosen so that a macromonomer having terminal isocyanate groups is formed. This macromonomer additionally still contains carboxyl, phosphonic acid or sulfonic acid groups as well as lateral vinyl groups. The free isocyanate groups of this macromonomer are then reacted with primary or secondary amines, alcohols or thioalcohols to form urea, urethane or thiourethane groups. The macromonomer modified in this way is then likewise polymerized via the vinyl groups using initiators which form free radicals.

A third route comprises preparing a polyaddition product, as in the second process variant, by reaction of polyhydroxy compounds from the group comprising polyhydroxy-polyethers, polyhydroxy-polyesters and polyhydroxy-polycarbonates, as well as polyhydroxycarboxylic acids, polyhydroxyphosphonic acids and polyhydroxysulfonic acids, and polyisocyanates and additionally a monomer containing at least one vinyl group and at least two hydroxyl groups. An excess of polyisocyanate is also used in this case, so that the macromonomer formed has lateral vinyl groups, carboxyl, phosphonic acid or sulfonic acid groups and terminal isocyanate groups. This macromonomer is then reacted with a monomer which, in addition to a vinyl group, also contains a group which reacts with isocyanate groups, such as, for example, the hydroxyl, amino or mercapto group. These monomers can be used by themselves, but it is also possible for these monomers to be employed as a mixture with primary or secondary amines, alcohols or thioalcohols. A macromonomer which contains lateral vinyl groups and terminal vinyl groups is obtained in this manner. This macromonomer is then likewise polymerized in the last stage via the vinyl groups using initiators which form free radicals.

A fourth process variant comprises a procedure in which the monomer which carries the carboxyl, phosphonic acid or sulfonic acid group is only incorporated into the previously formed macromonomer at the end. In this process variant, a polyaddition product is first formed from polyhydroxy-polyethers, polyhydroxy-polyesters or polyhydroxy-carbonates, polyisocyanates and monomers containing both at least one vinyl group and at least two hydroxyl groups. A molar excess of polyisocyanate is also used here, so that the macromonomer formed contains terminal isocyanate groups. This macromonomer then additionally also contains lateral vinyl groups.

On the other hand, the intermediate product formed can be lengthened in its chain by reacting the isocyanate groups of this polyaddition product with diaminocarboxylic acids or diaminosulfonic acids. Here also the vinyl groups are then finally subjected to polymerization initiated by free radicals.

A procedure is preferably followed in which the dihydroxyvinyl compound is not incorporated at the same time as the polyol during the polyaddition, but a prepolymer solely of polyol, polyisocyanate and if appropriate polyhydroxy acid is first converted into a prepolymer containing terminal OH or NCO groups. In a second stage, this prepolymer is then reacted with the dihydroxyvinyl compound and further polyisocyanate to give the macromonomer containing vinyl groups and terminal OH or NCO groups.

The starting compounds required for the preparation of the polyurethane dispersions according to the invention are to be described specifically in more detail below.

Possible polyhydroxy-polyethers are compounds of the formula

in which

R is hydrogen or a lower alkyl radical, optionally with various substituents, n is a number from 2 to 6 and m is a number from 10 to 120.

Examples are poly(oxytetramethylene) glycols, poly(oxyethylene) glycols and poly(oxypropylene) glycols. The preferred polyhydroxy-polyethers are poly(oxypropylene) glycols having a molecular weight in the range from 400 to 5000.

The polyhydroxy-polyesters are prepared by esterification of organic polycarboxylic acids or their anhydrides with organic polyols. The polycarboxylic acids and the polyols can be aliphatic or aromatic polycarboxylic acids and polyols.

The polyols used for the preparation include alkylene glycols, such as ethylene glycol, butylene glycol, neopentylglycol and hexane-1,6-diol, and other glycols, such as dimethylolcyclohexane, 2,2-bis(4-hydroxycyclohexyl) propane and trishydroxyalkylalkanes, such as, for example, trimethylolpropane, and tetrakishydroxyalkylalkanes, such as, for example, pentaerythritol.

The acid component of the polyester primarily consists of low molecular weight polycarboxylic acids or their anhydrides having 2 to 18 carbon atoms in the molecule. Suitable acids are, for example, phthalic acid, isophthalic acid, terephthalic acid, tetrahydrophthalic acid, hexahydrophthalic acid, succinic acid, adipic acid, azelaic acid, sebacic acid, maleic acid, glutaric acid, hexachloroheptanedicarboxylic acid, alkyl- and alkenylsuccinic acid, for example n-octenylsuccinic acid and n- and iso-dodecenylsuccinic acid, tetrachlorophthalic acid, trimellitic acid and pyromellitic acid. Instead of these acids, their anhydrides, where these exist, can also be used. Dimeric and trimeric fatty acids can also be employed as the polycarboxylic acids.

The terms polyhydroxy-polyether and polyhydroxy-polyester are also to be understood as meaning those products of this type which contain monomers having carboxyl, phosphonic acid or sulfonate groups.

Polyhydroxy-polyesters which are derived from lactones can furthermore be used in the invention.

These products are obtained, for example, by reaction of an ε-caprolactone with a polyol. Such products are described in U.S. Pat. No. 3,169,945.

The polylactone-polyols which are obtained by this reaction are distinguished by the presence of a terminal hydroxyl group and by recurring polyester contents which are derived from the lactone. These recurring molecular contents can correspond to the formula

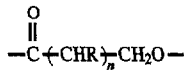

in which n is preferably 4 to 6 and the substituent is hydrogen, an alkyl radical, a cycloalkyl radical or an alkoxy radical, no substituent containing more than 12 carbon atoms.

The lactone used as the starting material can be any desired lactone or any desired combination of lactones, and this lactone should contain at least 6 carbon atoms in the ring, for example 6 to 8 carbon atoms, and 2 hydrogen substituents should be present on the carbon atom bonded to the oxygen group of the ring. The lactone used as the starting material can be represented by the following general formula:

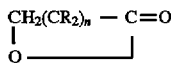

in which n and R have the meaning already given.

The lactones preferred in the invention are the ε-caprolactones, in which n has the value 4. The most preferred lactone is unsubstituted ε-caprolactone, in which n has the value 4 and all the R substituents are hydrogen. This lactone is particularly preferred, since it is available in large amounts and produces coatings which have excellent properties. Various other lactones can furthermore be used individually or in combination.

Examples of aliphatic polyols which are suitable for the reaction with the lactone are ethylene glycol, 1,3-propanediol, 1,4-butanediol, hexane-1,6-diol, dimethylolcyclohexane, trimethylolpropane and pentaerythritol.

Possible starting compounds are furthermore polycarbonate-polyols and polycarbonate-diols which correspond to the general formula

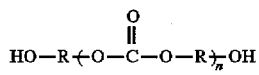

where R is an alkylene radical. These OH-functional polycarbonates can be prepared by reaction of polyols, such as propane-1,3-diol, butane-1,4-diol, hexane-1,6-diol, diethylene glycol, triethylene glycol, 1,4-bis-hydroxymethylcyclohexane, 2,2-bis(4-hydroxycyclohexyl) propane, neopentylglycol, trimethylolpropane or pentaerythritol, with di-carbonates, such as dimethyl, diethyl or diphenyl carbonate, or phosgene. Mixtures of such polyols can likewise be employed. Mixtures of polyhydroxy-polyethers, polyhydroxy-polyesters and polyhydroxy-polycarbonates are likewise possible.

The polyhydroxy-polyethers, polyhydroxy-polyesters and polyhydroxy-polycarbonates described above can be employed by themselves or together. These polyhydroxy compounds can moreover also be employed together with various amounts of low molecular weight isocyanate-reactive polyols, polyamines or polymercaptans. Possible compounds of this type are, for example, ethylene glycol, butanediol, hexane-1,6-diol, dimethylolcyclohexane, 2,2-bis (4-hydroxycyclohexyl)propane, pentaerythritol, trimethylolpropane, ethylenediamine, propylenediamine and hexamethylenediamine.

Low molecular weight polyols, preferably diols, which moreover also contain an ionic group in the form of the carboxylic acid, phosphonic acid or sulfonic acid group are employed as a further unit for the preparation of the polyurethane dispersions according to the invention. Examples of this group of monomers are $\alpha$-$C_2$-$C_{10}$-bis-hydroxycarboxylic acids, such as, for example, dihydroxypropionic acid, dimethylolpropionic acid, dihydroxyethylpropionic acid, dimethylolbutyric acid, dihydroxysuccinic acid and dihydroxybenzoic acid, or 3-hydroxy-2-hydroxymethylpropanesulfonic acid and 1,4-dihydroxybutanesulfonic acid.

These monomers are preferably neutralized before the reaction with a tertiary amine, such as, for example, trimethylamine, triethylamine, dimethylaniline, diethylaniline or triphenylamine, in order to avoid reaction of the acid group with the isocyanate. If the probability of such a reaction is only slight, the acid groups can also be neutralized only after their incorporation into the polyurethane macromonomer. The neutralization is then carried out with aqueous solutions of alkali metal hydroxides or with amines, for example with trimethylamine, triethylamine, dimethylaniline, diethylaniline, triphenylamine, dimethylethanolamine, aminomethylpropanol and dimethylisopropanolamine, or with ammonia. In addition, the neutralization can also be carried out with mixtures of amines and ammonia.

Examples of suitable polyisocyanates are trimethylene diisocyanate, tetramethylene diisocyanate, pentamethylene diisocyanate, hexamethylene diisocyanate, propylene diisocyanate, ethylethylene diisocyanate, 2,3-dimethylethylenediisocyanate, 1-methyltrimethylene diisocyanate, cyclopentylene 1,3-diisocyanate, cyclohexylene 1,4-diisocyanate, cyclohexylene 1,2-diisocyanate, phenylene 1,3-diisocyanate, phenylene 1,4-diisocyanate, toluylene 2,4-diisocyanate, toluylene 2,6-diisocyanate, biphenylene 4,4'-diisocyanate, naphthylene 1,5-diisocyanate, naphthylene 1,4-diisocyanate, 1-isocyanatomethyl-5-isocyanato-1,3,3-trimethylcyclohexane, bis-(4-isocyanatocyclohexyl)

methane, bis-(4-isocyanatocyclophenyl)methane, 4,4'-diisocyanatodiphenyl ether, 2,3-bis-(8-isocyanatooctyl)-4-octyl-5-hexylcyclohexene, trimethylhexamethylene diisocyanates, tetramethylxylylene diisocyanates, isocyanurates of the above diisocyanates and allophanates of the above diisocyanates. Mixtures of such di- or polyisocyanates can likewise be employed.

It is of particular importance for the polyurethane dispersions according to the invention that the macromonomers which lead to these dispersions contain lateral vinyl groups and optionally also terminal vinyl groups. The term terminal vinyl groups is intended to mean those vinyl groups which hang on the start or end of the polymer chain, while lateral vinyl groups are those which do not hang on the start or end of the polymer chain but are incorporated inbetween.

The lateral vinyl groups are obtained by incorporation into the macromonomer of those monomers which contain at least two hydroxyl groups and at least one vinyl group. Examples of these are trimethylolpropane (TMP) derivatives, such as, for example, TMP monoallyl ether (2-propenyloxy-2-hydroxymethyl-propanol) and TMP mono(meth)acrylate (2-(meth)acryloyloxy-2-hydroxymethyl-propanol); glycerol mono(meth)acrylate; adducts of $\alpha,\beta$-unsaturated carboxylic acids, such as (meth) acrylic acid, on diepoxides, for example bisphenol A diglycidyl ether and hexanediol diglycidyl ether; adducts of dicarboxylic acids, such as, for example, adipic acid, terephthalic acid or the like, on (meth)acrylic acid glycidyl ester; and monovinyl ethers of polyols.

Terminal vinyl groups are obtained by reaction of the macromonomers containing isocyanate groups with vinyl compounds which contain a group which is reactive toward isocyanate groups. Examples of these are reaction products of monoepoxides and $\alpha,\beta$-unsaturated carboxylic acids, such as, for example, reaction products of glycidyl versatate and (meth)acrylic acid, reaction products of $\alpha,\beta$-unsaturated glycidyl esters or ethers with monocarboxylic acids, for example reaction products of glycidyl (meth)acrylate and stearic acid or linseed oil fatty acid, and furthermore hydroxyalkyl (meth)acrylates, for example hydroxyethyl (meth)acrylate or hydroxypropyl (meth)acrylate, as well as (meth)acrylates having amino groups, for example t-butylaminoethyl methacrylate.

Where the macromonomers built up from these monomers are prepared by the second or third process variant, they are additionally also reacted with amines, alcohols and/or thioalcohols. For this reaction, the intermediate product produced in the first stage, which contains terminal isocyanate groups and lateral vinyl groups as well as carboxyl, phosphonic acid or sulfonic acid groups, is reacted completely or partly with a mines, alcohols and/or thioalcohols. Possible reactants here are, for example, primary amines, such as propylamine, butylamine, pentylamine, 2-amino-2-methylpropanol, ethanolamine and propanolamine; secondary amines, such as diethanolamine, dibutylamine and diisopropanolamine; primary alcohols, such as methanol, ethanol, propanol, butanol, hexanol, dodecanol and stearyl alcohol; and secondary alcohols, such as isopropanol and isobutanol, and the corresponding thioalcohols.

In the fourth process variant, the isocyanate groups of the intermediate product are further reacted on the one hand with aminocarboxylic acids, aminosulfonic acids, aminophosphonic acids, hydroxycarboxylic acids or hydroxysulfonic acids by methods which are known per se. Reactants which are possible here are, for example, aminocaproic acid, aminoacetic acid, aminobutyric acid, aminolauric acid, hydroxybutyric acid, aminomethanesulfonic acid, aminoethanesulfonic acid, aminopropanesulfonic acid or the analogous aminophosphonic acids, salicylic acid, hydroxystearic acid and 2-hydroxyethanesulfonic acid.

The preparation of the intermediate products in the first stages is carried out by the customary methods which are known in urethane chemistry. Tertiary amines, such as, for example, triethylamine, dimethylbenzylamine and diazabicyclooctane, and dialkyltin(IV) compounds, such as, for example, dibutyltin dilaurate, dibutyltin dichloride and dimethyltin dilaurate, can be employed as catalysts here. The reaction takes place in the melt without a solvent, in the presence of a solvent or in the presence of a so-called reactive diluent. Possible solvents are those which can be removed later by distillation, for example methyl ethyl ketone, methyl isobutyl ketone, dioxane, acetone, tetrahydrofuran, toluene and xylene. These solvents can be completely or partly distilled off after the preparation of the polyurethane macromonomers or after the free radical polymerization. In addition, water-dilutable high-boiling solvents, for example N-methylpyrrolidone, can also be employed, these then remaining in the dispersion. Further solvents, such as, for example, glycol ethers or esters thereof, can also be added before the dispersing process. Suitable glycol ethers are, for example, butylglycol, butyldiglycol, methoxypropanol, dipropylene glycol monomethyl ether or diglycol dimethyl ether. The reactive diluents are $\alpha,\beta$-unsaturated monomers, which are copolymerized with the macromonomers containing vinyl groups in the final stage. Examples of such reactive diluents are $\alpha,\beta$-unsaturated vinyl monomers, such as alkyl acrylates, methacrylates and crotonates having 1 to 20 carbon atoms in the alkyl radical, di-, tri- and tetraacrylates, -methacrylates and -crotonates of glycols, tri- and tetrafunctional alcohols, substituted and unsubstituted acryl- and methacrylamides, vinyl ethers, $\alpha,\beta$-unsaturated aldehydes and ketones, vinyl alkyl ketones having 1 to 20 carbon atoms in the alkyl radical, vinyl ethers, vinyl esters, diesters of $\alpha,\beta$-unsaturated dicarboxylic acids, styrene and styrene derivatives, such as, for example, $\alpha$-methylstyrene.

The macromonomers obtained by the process variants described above are then neutralized, if the acid groups in the monomers which carry such groups have not already been employed in the neutralized form from the beginning.

The neutralization is carried out with aqueous solutions of alkali metal hydroxides or with amines, for example with trimethylamine, triethylamine, dimethylaniline, diethylaniline, triphenylamine, dimethylethanolamine, aminomethylpropanol, dimethylaminomethylpropanol or dimethylisopropanolamine, or with ammonia. In addition, the neutralization can also be carried out with mixtures of amines and ammonia.

To prepare the polyurethane dispersions according to the invention, the macromonomers which are obtained by the preparation variants described above and contain vinyl groups are converted into an aqueous dispersion by addition of water and polymerized by methods which are known per se by polymerization initiated by free radicals. If so-called reactive diluents are not present from the beginning, monomers of this type, as described above, can be added during this polymerization and are then copolymerized with the polyurethane macromonomers.

Carboxyl-, hydroxyl-, amino-, ether- and mercaptofunctional $\alpha,\beta$-unsaturated vinyl monomers can also furthermore additionally be added immediately before or during the free radical polymerization. Examples of these are hydroxyethyl (meth)acrylate, hydroxypropyl (meth)acrylate, glycidyl (meth)acrylate, dimethylaminoethyl methacrylate, t-butylaminoethyl methacrylate, (meth)acrylic acid or crotonic acid. The content of copolymerized vinyl monomers is 0 to 95% by weight, preferably 5 to 70% by weight, based on the solid of the polyurethane dispersion. The ratio of flexible and rigid segments in the polyurethane macromonomers is 0.30 to 6, particularly preferably 0.8 to 3. Possible initiators for the polymerization are the known initiators which form free radicals, such as ammonium peroxydisulfate, potassium peroxide-sulfate, sodium peroxide-sulfate, hydrogen peroxide, organic peroxides, such as, for example, cumene hydroperoxide, t-butyl hydroperoxide, di-tert-butyl peroxide and dioctyl peroxide, tert-butyl perpivalate, tert-butyl perisononanoate, tert-butyl perethylhexanoate, tert-butyl perneodecanoate, di-2-ethylhexyl peroxydicarbonate, diisotridecyl peroxydicarbonate and azo compounds, such as, for example, azo-bis(isobutyronitrile) and azo-bis(4-cyanovaleric acid), or the customary redox systems, for example sodium sulfite, sodium dithionite and ascorbic acid and organic peroxides or hydrogen peroxide. Regulators (mercaptans), emulsifiers, protective colloids and other customary auxiliaries can moreover also be added.

If the preparation of the macromonomers has been carried out in a solvent which can be fractionated out of the aqueous phase or forms an azeotrope with water, for example in acetone, methyl ethyl ketone, methyl isobutyl ketone, dioxane, tetrahydrofuran, toluene or xylene, this solvent is finally removed from the dispersion by distillation. Aqueous polyurethane dispersions are obtained in all cases. The acid numbers of these polyurethane dispersions are in the range from 5 to 80, particularly preferably in the range from 10 to 40 units.

Further details on the preparation of the macromonomers and polymerization thereof to give the polyurethane dispersions according to the invention can be seen from the following general process descriptions. These process conditions are preferred embodiments.

1. Solvent-free
   a. without an auxiliary solvent
   α. with terminal OH groups At temperatures of 100° to 150° C., particularly preferably 120° to 135° C., the polyhydroxy acid and if appropriate low molecular weight polyols are dissolved in a polyol having an average molecular weight of 400 to 5000 and reacted with a polyisocyanate or polyisocyanate mixtures to give a product which has OH end groups and has an average molecular weight (Mn) of 500 to 12,000, particularly preferably 600 to 8000. After the product has been cooled to a temperature of 30° to 100° C., particularly preferably 50° to 80° C., a comonomer which is not isocyanate-reactive (reactive diluent) and an NCO-reactive vinyl compound which is at least difunctional are added. The mixture is reacted at this temperature, by further addition of polyisocyanate, which is present in less than the equivalent amount with respect to the OH components, to give an OH-functional polyurethane macromonomer having an average molecular weight of 700 to 24,000, particularly preferably 800 to 16,000. This resulting resin solution is neutralized with amines or other bases and dispersed in water. Other vinyl comonomers can also be added to the resulting dispersion before or during the free radical polymerization which is still to be carried out. The free vinyl compounds are then polymerized in the aqueous dispersion using initiators which form free radicals, at a temperature of 0° to 95° C., particularly preferably 40° to 95° C., and at a temperature of 30° to 70° C. if redox systems are used. A solvent-free polyurethane dispersion is formed here.

β. with terminal urethane, thiourethane or urea groupings

At temperatures of 100° to 150° C., particularly preferably 120° to 135° C., the polyhydroxy acid and if appropriate low molecular weight polyols are dissolved in a polyol having an average molecular weight of 400 to 5000 and reacted with a polyisocyanate or polyisocyanate mixtures to give a product which has terminal OH groups and has an average molecular weight (Mn) of 500 to 12000, particularly preferably 600 to 8000. After the product has been cooled to a temperature of 30° to 100° C., particularly preferably 50° to 80° C., a comonomer which is not isocyanate-reactive (reactive diluent) and an NCO-reactive vinyl compound which is at least difunctional are added. A resin containing terminal NCO groups is built up at this temperature by further addition of polyisocyanate, and the product is then reacted with a monofunctional, NCO-reactive compound to give a polyurethane macromonomer having terminal urethane, thiourethane or urea groupings and an average molecular weight of 700 to 24000, particularly preferably 800 to 16000. This resulting resin solution is neutralized with amines or other bases and dispersed in water. Further vinyl comonomers can also be added to the resulting dispersion before or during the free radical polymerization which is still to be carried out. The free vinyl compounds are then polymerized in the aqueous dispersion using initiators which form free radicals, at a temperature of 0° to 95° C., particularly preferably 40° to 95° C., and at a temperature of 30° to 70° C. if redox systems are used. A solvent-free polyurethane dispersion is formed here.

b. with an auxiliary solvent
   α. with terminal OH groups

In contrast to process 1.a. α, in this case all the polyol components—including the NCO-reactive vinyl compound—are dissolved in a solvent which can be fractionated out of the aqueous phase or forms an azeotrope with water and are reacted directly with polyisocyanate or polyisocyanate mixtures to give a polyurethane macromonomer which contains terminal OH groups and has a molecular weight of 500 to 30000, particularly preferably 700 to 20000. The solvent content is 1 to 80% by weight, particularly preferably between 10 and 50% by weight, based on the solid of the polyurethane macromonomer. The temperature for this step is between 30° and 100° C., particularly preferably between 50° and 80° C. After neutralization with amines or other bases, the product is dispersed in water. The auxiliary solvent is then distilled off from the aqueous phase, if necessary under a slight vacuum. Comonomers can also be added to this solvent-free dispersion before or during the free radical polymerization which is still to be carried out. Polymerization is then carried out with initiators which form free radicals, at a temperature of between 0° and 95° C., particularly preferably between 40° and 95° C., and at a temperature of 30° to 70° C. if redox systems are used, to give a solvent-free polyurethane dispersion.

b. with an auxiliary solvent
   β. with terminal urethane, thiourethane or urea groupings In contrast to process 1.a. β, in this case all the polyol components—including the NCO-reactive vinyl compound—are dissolved in a solvent which can be fractionated out of the aqueous phase or forms an azeotrope with water and are reacted directly with polyisocyanate or polyisocyanate mixtures to give the product containing terminal NCO groups. The solvent content is 1 to 80% by weight, particularly preferably between 10 and 50% by weight, based on the solid of the polyurethane macromonomer. The temperature for this step is between 30° and 100° C., particularly preferably between 50° and 80° C. After further reaction with a monofunctional isocyanate-reactive compound to give a polyurethane macromonomer having urethane, thiourethane or urea groupings and a molecular weight of 500 to 30000, particularly preferably 700 to 20000, the product is neutralized with amines or other bases and dispersed in water. The auxiliary solvent is then distilled off from the aqueous phase, if necessary under a slight vacuum. Comonomers can also be added to this solvent-free dispersion before or during the free radical polymerization which is still to be carried out. Polymerization is then carried out with initiators which form free radicals, at a temperature of between 0° and 95° C., particularly preferably between 40° and 95° C., and at a temperature of 30° to 70° C. if redox systems are used, to give a solvent-free polyurethane dispersion.

Possible solvents in the processes corresponding to 1.b.α and 1.b.β are, for example, acetone, tetrahydrofuran, dioxane, methyl ethyl ketone, methyl isobutyl ketone, toluene and xylene.

2. Containing solvent

If a non-distillable auxiliary solvent, such as, for example, N-methylpyrrolidone, is used, the procedure is exactly as in process 1.b.α and β, but the distillation after the dispersing operation is omitted and if appropriate vinyl monomers can be added before or during the free radical polymerization. The polymerization is carried out as in process 1.b. α and β. The solvent content is in the range from 0.1 to 30% by weight, particularly preferably 1 to 15% by weight, based on the total binder dispersion.

Because of their chemical build-up, the polyurethane dispersions according to the invention are suitable for diverse uses, for example for the preparation of coating systems, inter alia for coating wood, as binders for water-dilutable adhesives or as resins for printing inks.

They can be combined with and are in general compatible with other aqueous dispersions and solutions of plastics, for example acrylic and/or methacrylic polymers, polyurethane, polyurea resins, polyester resins and epoxy resins, thermoplastics based on polyvinyl acetate, -vinyl chloride, -vinyl ether, -chloroprene and -acrylonitrile and ethylene/butadiene/styrene copolymers. They can also be combined with substances which have a thickening action and are based on polyacrylates or polyurethanes containing carboxyl groups, hydroxyethylcellulose, polyvinyl alcohols and inorganic thixotropic agents, such as bentonite, sodium/magnesium silicates and sodium/magnesium/fluorine/lithium silicates.

The polyurethane dispersions according to the invention can be applied to the most diverse substrates, for example ceramic, wood, glass, concrete and preferably plastics, such as polycarbonate, polystyrene, polyvinyl chloride, polyester, poly(meth)acrylates, acrylonitrile/butadiene/styrene polymers and the like, and preferably to metal, such as iron, copper, aluminum, steel, brass, bronze, tin, zinc, titanium, magnesium and the like. They adhere to the various substrates without adhesion-promoting primers or intermediate layers.

The polyurethane dispersions according to the invention are suitable, for example, for the production of corrosion-preventing coatings and/or intermediate coatings for the most diverse fields of use, in particular for the production of metallic and solid base paints in multi-coat build-ups of paint for the fields of painting of automobiles and plastics, and for producing primer paints for the field of painting of plastics.

Because of the short flush-off times of the base paints based on the polyurethane dispersions according to the invention, the pigmented coat of base paint can be over-varnished with a clear varnish without a storing step (wet-in-wet process) and the coatings can then be stored together or subjected to forced drying. Base paints prepared with the polyurethane dispersions according to the invention give paint films of the same quality largely independently of the storing or drying temperature, so that they can be employed both as a repair paint for motor vehicles and as a storing paint for series painting of motor vehicles. In both cases, paint films having a good adhesion to the original coating and a good resistance to condensation water result. The brilliance of the paint coating after a condensation water test is furthermore not noticeably impaired.

The crosslinking agents customary in the paint industry, such as, for example, water-soluble or -emulsifiable melamine or benzoguanamine resins, polyisocyanates or prepolymers having terminal isocyanate groups, water-soluble or -dispersible polyaziridines and blocked polyisocyanates, can be added during formulation of water-dilutable paints using the polyurethane dispersions according to the invention. The aqueous coating systems can contain all the inorganic or organic pigments and dyestuffs which are known and are customary in paint technology, as well as wetting agents, foam suppressants, flow control agents, stabilizers, catalysts, fillers, plasticizers and solvents.

The polyurethane dispersions according to the invention can also be used directly for gluing any desired substrates. To achieve specific adhesive properties, the polyurethane dispersions according to the invention can be mixed with other dispersions or solutions of plastics (see above). Crosslinking agents, such as, for example, polyisocyanates or prepolymers having terminal isocyanate groups or water-soluble or -emulsifiable melamine or benzoguanamine resins, can furthermore be added to improve the resistance to heat and peeling.

The adhesives based on the polyurethane dispersions according to the invention can contain the additives customary in adhesives technology, such as plasticizers, solvents, film-binding auxiliaries, fillers and synthetic and naturally occurring resins. They are specifically suitable for the production of gluings of substrates in the motor vehicle industry, for example gluing of interior finishings, and in the shoe industry, for example for gluing the shoe sole and shoe shaft. The adhesives based on the polyurethane dispersions according to the invention are prepared and processed by the customary methods of adhesives technology used for aqueous dispersion and solution adhesives.

EXAMPLE 1

357 g of a polyester prepared from hexane-1,6-diol and isophthalic and adipic acid and having a hydroxyl number of 84 and an acid number of less than 4 are heated to 130° C. together with 32.6 g of dimethylolpropionic acid and 5.6 g of butane-1,4-diol and the mixture is kept at this temperature until a homogeneous solution exists. 99.2 g of tetramethylxylylene diisocyanate are then metered in over a period of 30 to 35 minutes, while stirring, and stirring is continued at 130° C. until free isocyanate groups are no longer present.

After cooling to 70° C., a solution consisting of 65.6 g of methyl methacrylate, 6.3 g of glycerol monomethacrylate and 0.12 g of 2,6-di-tert-butyl-4-methylphenol is added rapidly and the mixture is homogenized. 24.3 g of tetramethylxylylene diisocyanate are then added over a period of 30 minutes and the components are reacted at 70° C. until the content of free isocyanate groups is less than 0.05% by weight, based on the total weight. After addition of 18.5 g of triethylamine, the mixture is homogenized for 5 minutes.

1030 g of water having a temperature of 95° C. are then added to the prepolymer solution, while stirring intensively. After cooling to 80° C., the mixture is stirred for a further hour. 10% by volume of an ammonium peroxodisulfate solution consisting of 0.8 g of ammonium peroxodisulfate and 50 g of water are added at 80° C. to the dispersion thus prepared. The remaining amount of the ammonium peroxodisulfate solution is metered in over a period of 30 minutes.

The temperature is then kept at 78° to 80° C. for a further 2 hours.

After cooling to room temperature, the dispersion is filtered through a 5 mm filter. The dispersion thus obtained has a solids content of 34.9% and a pH of 7.52.

EXAMPLE 2

249.8 g of a polyester prepared from neopentylglycol, hexane-1,6-diol and isophthalic and adipic acid and having a hydroxyl number of 37 and an acid number of less than 3 are dissolved under reflux in 150 g of acetone together with 24.7 g of dimethylolpropionic acid and 9.3 g of butane-1, 4-diol. 0.1 g of 2,6-di-tert-butyl-4-methylphenol and 16.6 g of glycerol monomethacrylate are then added and the mixture is homogenized. After addition of 134.2 g of tetramethylxylylene diisocyanate, the mixture is stirred at the reflux temperature until the isocyanate content is 1.08% by weight, based on the total weight.

15.5 g of diethanolamine are now added rapidly to the prepolymer solution thus obtained and the mixture is homogenized for 30 minutes. After 13.1 g of triethylamine have been metered in, 1108 g of water having a temperature of 80° C. are added to the polymer solution, while stirring intensively. The acetone solvent is then separated off from the resulting dispersion by vacuum distillation. After addition of 51.1 g of methyl methacrylate, the temperature is increased to 80° C. and the mixture is stirred-for a further 30 minutes. 10% by volume of an ammonium peroxodisulfate solution consisting of 0.8 g of ammonium peroxodisulfate and 50 g of water is then added at 80° C. The remaining amount of the ammonium peroxodisulfate solution is metered in over a period of 30 minutes. The temperature is kept at 78° to 80° C. for a further 2 hours.

After cooling to room temperature, the dispersion is brought to a solids content of 30% and filtered through a 5 mm filter. The resulting dispersion has a pH of 7.46.

EXAMPLE 3

224.1 g of a poly(butanyl adipate) containing terminal OH groups (OH number: 139) are initially introduced into 200 g of acetone together with 21 g of dimethylolpropionic acid, 0.1 g of 2,6-di-tert-butyl-4-methylphenol, 18.1 g of glycerol monomethacrylate and 7 g of ethylene glycol at 70° C. 133.2 g of molten methylenediphenyl diisocyanate (MDI) are added to this mixture and the components are reacted to an NCO content of 1.1%. 11.1 g of triethylamine are stirred into the hot solution and a dispersion is then obtained with 636 g of deionized water. The acetone is distilled off from the dispersion under slightly reduced pressure. A mixture of 55 g of methyl methacrylate and 1 g of tert-butyl hydroperoxide is stirred into the solvent-free dispersion. A solution of 1.74 g of ascorbic acid and 100 g of deionized water is metered in at 50° C. over 2 hours. After the mixture has been further stirred at 50° C. for one hour, the aqueous polyurethane dispersion is obtained.

EXAMPLE 4

304.4 g of poly(butanediol adipate)-diol having an OH number of 45 is heated to 130° C. together with 23.1 g of dimethylolpropionic acid and reacted with 40.2 g of toluylene diisocyanate at this temperature. The product is dissolved in 50 g of stabilized methyl methacrylate, together with 14.9 g of glycerol monomethacrylate, and reacted with 40.8 g of toluylene diisocyanate at 65°–70° C. The product is reacted with the equimolar amount of diethanolamine, corresponding to the free NCO content. The mixture is then neutralized with 12.1 g of triethylamine and a dispersion is obtained with 674.6 g of deionized water. 51 g of a 2% strength by weight aqueous solution of ammonium peroxodisulfate are metered into this dispersion at 80° C. and the mixture is then subsequently stirred for 2 hours. A dispersion having a solids content of 40% by weight, a pH of 7.4 and a dynamic viscosity of 352 mPas is formed.

EXAMPLE 5

299.2 g of poly(butanediol adipate) having an OH number of 45 is heated to 130° C. together with 23.1 g of dimethylolpropionic acid and 18.6 g of hexane-1,6-diol and the components are reacted with 66 g of toluylene diisocyanate at this temperature. This product is dissolved in 55 g of stabilized methyl methacrylate, together with 16.8 g of glycerol monomethacrylate, and reacted with 16.3 g of toluylene diisocyanate at 65°–70° C. The mixture is then neutralized with 12.2 g of triethylamine and dispersed with 681.8 g of deionized water. 51 g of a 2% strength by weight aqueous solution of sodium peroxodisulfate are metered into this dispersion at 80° C. and the mixture is then subsequently stirred for 2 hours. The resulting dispersion has a solids content of 40% by weight, a pH of 7.3 and a dynamic viscosity of 18.2 mPas.

We claim:

1. A polyurethane dispersion prepared by polymerization, initiated by free radicals, of polyurethane macromonomers containing carboxyl, phosphonic acid or sulfonic acid groups and lateral vinyl groups and optionally terminal vinyl, hydroxyl, urethane, thiourethane and/or urea groups.

2. A polyurethane dispersion as claimed in claim 1, prepared by polymerization of polyurethane macromonomers containing carboxyl, phosphonic acid or sulfonic acid groups as well as terminal hydroxyl groups and lateral vinyl groups, the polyurethane macromonomers being obtained by polyaddition of polyhydroxy-polyethers, polyhydroxy-polyesters or polyhydroxy-polycarbonates as well as polyhydroxycarboxylic acids, polyhydroxyphosphonic acids or polyhydroxysulfonic acids, and polyisocyanates and monomers containing at least two hydroxyl groups and at least one vinyl group.

3. A polyurethane dispersion as claimed in claim 1, prepared by polymerization of polyurethane macromonomers obtained by polyaddition of polyhydroxy-polyethers, polyhydroxy-polyesters or polyhydroxy-polycarbonates as well as polyhydroxycarboxylic acids, polyhydroxyphosphonic acids or polyhydroxysulfonic acids, and polyisocyanates and a monomer containing at least two hydroxyl groups and at least one vinyl group to form a macromonomer containing isocyanate and carboxyl, phosphonic acid or sulfonic acid groups as well as lateral vinyl groups, and reaction of the macromonomer thus formed with amines, alcohols or thioalcohols.

4. A polyurethane dispersion as claimed in claim 1, prepared by polymerization of polyurethane macromonomers which contain carboxyl, phosphonic acid or sulfonic acid groups, terminal and lateral vinyl groups and optionally urethane, thiourethane or urea groups and are obtained by polyaddition of polyhydroxy-polyethers, polyhydroxy-polyesters or polyhydroxy-polycarbonates as well as polyhydroxycarboxylic acids, polyhydroxyphosphonic acids or polyhydroxysulfonic acids, and polyisocyanates and monomers containing at least one vinyl group and at least two hydroxyl groups, and subsequent reaction with a monomer which, in addition to at least one vinyl group, also contains a group which reacts with isocyanate groups, optionally together with primary or secondary amines, alcohols or thioalcohols.

5. A polyurethane dispersion as claimed in claim 1, prepared by polymerization of polyurethane macromonomers obtained by polyaddition of polyhydroxy-polyethers, polyhydroxy-polyesters or polyhydroxy-polycarbonates and polyisocyanates and a monomer containing at least two hydroxyl groups and one vinyl group to form a macromonomer containing isocyanate groups and lateral vinyl groups, and reaction of the macromonomer thus formed with aminocarboxylic acids, aminosulfonic acids, hydroxycarboxylic acids or hydroxysulfonic acids.

6. A polyurethane dispersion as claimed in claim 1, wherein the polyhydroxy-polyethers, polyhydroxy-polyesters or polyhydroxy-polycarbonates contain carboxyl, phosphonic acid or sulfonic acid groups.

7. A polyurethane dispersion as claimed in claim 1, prepared by polymerization, initiated by free radicals, in an unsaturated monomer which serves as the solvent and is copolymerizable with the polyurethane macromonomers, if appropriate in the presence of further copolymerizable unsaturated monomers.

8. A polyurethane dispersion as claimed in claim 1, prepared by polymerization, initiated by free radicals, in a mixture of water and an organic solvent which is inert toward isocyanate groups, if appropriate in the presence of unsaturated monomers which can be copolymerized with the polyurethane macromonomers, and if appropriate removal of the organic solvent by distillation before or after the free radical polymerization.

9. A coating composition for substrates containing a polyurethane dispersion of claim 1.

10. An adhesive containing polyurethane dispersion of claim 1.

11. A printing ink containing as a binder a polyurethane dispersion of claim 1.

12. A metallic and solid base paint composition containing a polyurethane dispersion of claim 1.

* * * * *